May 30, 1961  B. H. ACOMB  2,986,160
PINCH VALVES
Original Filed Sept. 4, 1956  2 Sheets-Sheet 1

INVENTOR.
BY Richard S. Shreve, Jr.

May 30, 1961  B. H. ACOMB  2,986,160
PINCH VALVES
Original Filed Sept. 4, 1956  2 Sheets-Sheet 2
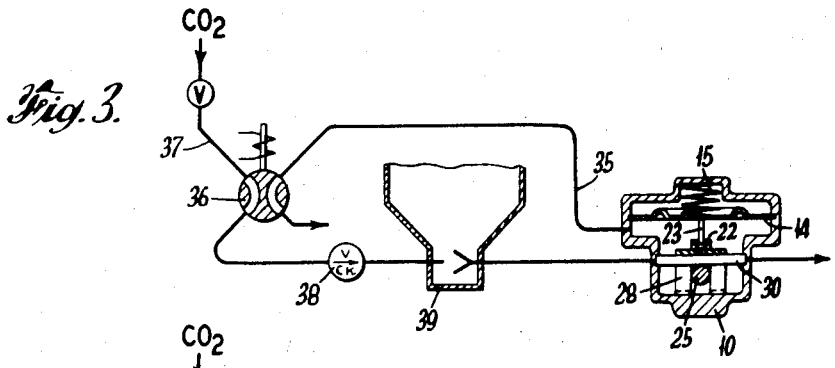
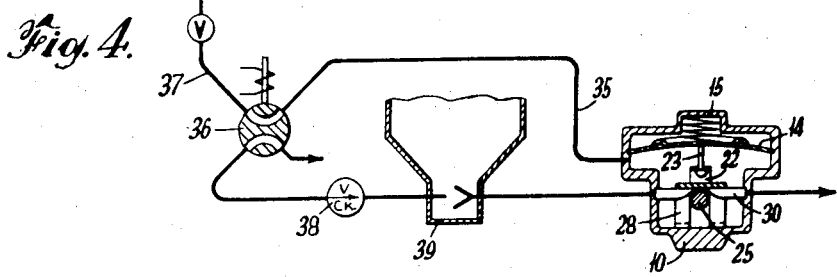
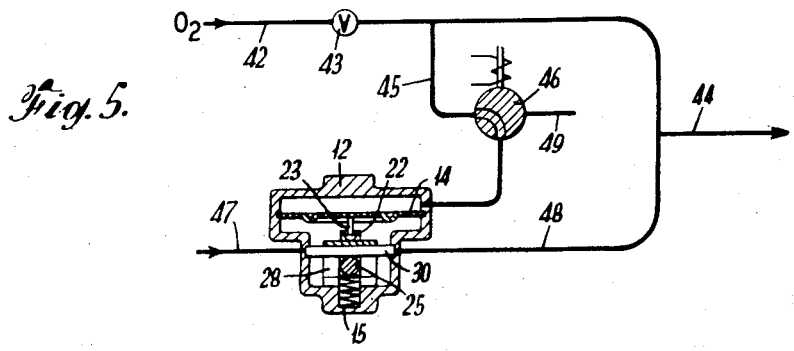
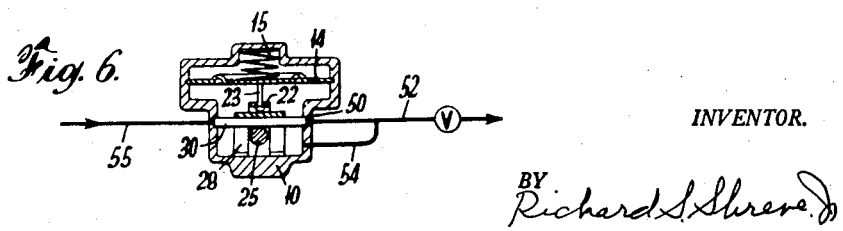
INVENTOR.
BY Richard S. Shreve

United States Patent Office 2,986,160
Patented May 30, 1961

2,986,160
PINCH VALVES

Byron H. Acomb, Watchung, N.J., assignor to Union Carbide Corporation, a corporation of New York Original application Sept. 4, 1956, Ser. No. 607,656. Divided and this application Dec. 8, 1958, Ser. No. 779,032

4 Claims. (Cl. 137—505.22)

This invention relates to pinch valves, and more particularly to diaphragm operated valves of this character for turning on and off the flow of powder-laden gas used, for example, in electric welding and in the thermochemical removal or deposition of metal. This application is a division of my parent application, Serial No. 607,656, filed September 4, 1956.

The main objects of the present invention are to provide a valve of this character which can be operated by the conveying gas, thereby eliminating the necessity of a separate gas source, and to maintain a pressure differential between the chamber and conveying tube so that the tube can withstand pressures in excess of the bursting limit of the material thereof.

In the drawings:

Fig. 3 is a diagram of the injector and by-pass, with the pinch valve open;

Fig. 4 is a similar diagram with the pinch valve closed;

Fig. 5 is a diagram of the by-pass for turning on and off the powder and carrier gas in desired sequence; and Fig. 6 is a diagram of the adaptation of the pinch valve as a pressure regulator.

Figure 1:
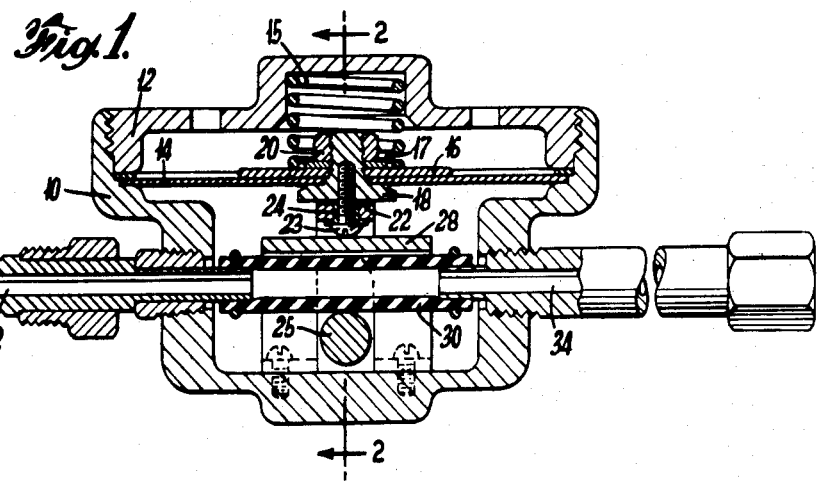
Fig. 1 is a vertical section through a pinch valve according to the preferred embodiment of the present invention.
Figure 2:
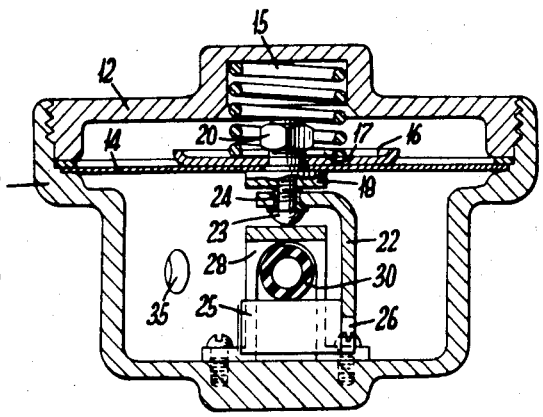
Fig. 2 is a section taken along the line 2—2 of Fig. 1.

The valve shown in the drawing comprises a body 10 provided with a cap 12, between which is clamped a flexible diaphragm 14. A diaphragm spring 15 seated in a socket inside the cap 12 bears against the diaphragm plate 16 outside of a spring guide washer 17. A diaphragm attaching screw 18 passes through the diaphragm 14, plate 16 and washer 17 and a nut 20 clamps them together.

Within the body 10 a pinching arm 22 is secured to the head of screw 18 by a smaller screw 23 passing through a bushing 24. A roller 25 is journaled on an axle 26 extending laterally from the bottom of the pinching arm.

The roller 25 is enclosed within a yoke 28 secured to the bottom of the body 10. Between the top of the yoke and the top of the roller 25 passes a pinch tube 30, connected at one end to an inlet 32 and at the other to an outlet 34 in the valve body 10. The roller 25 constitutes a movable jaw and the top of the yoke 28 constitutes a stationary jaw, between which the tube 30 is pinched.

The body 10 is provided with a by-pass 35 for pressurizing the chamber under the diaphragm 14 and surrounding the pinch tube 30. As shown in Figs. 3 and 4 the by-pass 35 is connected to a two-way valve 36, preferably solenoid operated. The valve 36 is connected to a supply line 37, and through a check valve 38 and injector 39 to the pinch tube 30.

When the pinch valve is in its normally open position shown in Figs. 1 and 3, the loading of the spring 15 on the diaphragm 14 depresses the pinching arm 22 so that the pinch tube 30 is wide open. The carrier gas from the supply line 37 passes through the valve 36 and check valve 38 to the injector 39 where it picks up the powder and carries it through the open pinch tube 30 for delivery and use.

To close off the pinch valve 30, the valve 36 is turned to the position shown in Fig. 4. The carrier gas from the supply 37 passes through the valve 36 and 35 to the pinch valve chamber in the body 10. The gas pressure against the diaphragm 14 is sufficient to overcome the loading of the spring 15 and the pinching arm is raised, thus compressing the pinch tube 30 between the roller 25 and the yoke 28.

In the form shown in Fig. 5, the position of the valve spring is reversed so that it loads the underside of the diaphragm, providing a normally closed pinch valve, which is opened by pressurizing the cap. This can also be accomplished by changing the position of the pinching arm to the upper side of the powder tube, lowering the yoke to form an anvil below the powder tube, placing the spring in the cap to provide a normally closed valve, and pressurizing the body.

As shown in Fig. 5, cutting oxygen is supplied by a line 42 controlled by a valve 43, and passes to a delivery line 44. Part of the oxygen from the line 42 passes through a by-pass 45 controlled by a two-way valve 46 to the cap 12. Powder-laden gas is supplied by a line 47 to the pinch tube 30. When the valve 46 is open, the pressure in the cap 12 overcomes the spring loading, and opens the pinch tube 30, so that powder-laden gas from the line 47 may pass through the line 48 to join the delivery line 44 and commingle with the cutting oxygen already flowing therein.

When the valve 46 is closed, the cap 12 is vented through the line 49 to the atmosphere and the pressure drop permits the spring to close the pinch tube 30. The cutting oxygen continues to flow through lines 42 and 44 until the valve 43 is closed.

In the form shown in Fig. 6, a restriction 50 is formed in the delivery line 52, and a by-pass 54 beyond the restriction is connected to the chamber in the body 10. Gas at higher pressure is supplied by an inlet line 55 to the pinch tube 30, and the restriction 50 causes a pressure drop into the delivery line 52. Whenever the pressure in the line 52 increases, due to reduced flow requirements or increased inlet pressure in tube 55, a proportional increase in pressure occurs. This increased pressure in line 52 passing through the by-pass 54 is transmitted to the diaphragm to cause proportional partial closing of the pinch tube 30. When the pressure in the line 52 decreases due to greater flow demand or reduced pressure in line 55, the pressure through the by-pass 54 decreases, and the spring causes proportional partial opening of the pinch tube 30.

What is claimed is:

1. A pinch valve comprising a valve body having an inlet connected to a supply line and an outlet connected to a delivery line, a diaphragm closing said body to form a chamber, a movable jaw in said chamber actuated by said diaphragm, spring means to bias said movable jaw to open position, a stationary jaw mounted in said body to cooperate with said movable jaw, a pinch tube extending from said inlet between said jaws to said outlet, and a by-pass from said supply line into said chamber for pressurizing said diaphragm and movable jaw to pinch said tube.

2. A pinch valve comprising a valve body having an inlet connected to a supply line and an outlet connected to a delivery line, a diaphragm closing said body to form a chamber, a pinch arm in said chamber carried by said diaphragm, a stationary jaw mounted in said body, a pinch tube extending from said inlet past said stationary jaw to said outlet, a by-pass from said supply line to said chamber for pressurizing said pinch tube to withstand pressures in excess of the bursting limit of the material thereof, a jaw carried by said pinch arm cooperating with said stationary jaw to pinch said tube and spring means to bias said movable jaw to open position.

3. A pinch valve comprising a valve body having an inlet connected to a supply line and an outlet connected to a delivery line, a diaphragm closing said body to form a chamber, a pinch arm in said chamber carried by said diaphragm, a movable jaw in said chamber carried by said pinch arm and actuated by said diaphragm, spring means to bias said jaw to closed position, a stationary jaw mounted in said body to cooperate with said movable jaw, a pinch tube extending from said inlet between said jaws to said outlet, a by-pass from said supply line to said chamber for pressurizing said diaphragm and movable jaw to open said pinch tube.

4. A pinch valve comprising a valve body having an inlet connected to a source of higher pressure gas and an outlet connected to a delivery line for lower pressure gas, a diaphragm closing said body to form a chamber, a movable jaw in said chamber actuated by said diaphragm, spring means to bias said jaw to open position, a stationary jaw mounted in said body to cooperate with said movable jaw, a pinch tube extending from said inlet between said jaws to said outlet, said delivery line having a restriction therein, and a by-pass from said delivery line beyond said restriction back to said chamber for pressurizing said diaphragm to cause partial closing of said pinch tube proportional to increase in pressure in said delivery line beyond said restriction and thereby regulate the delivery pressure.

References Cited in the file of this patent

UNITED STATES PATENTS

| | | |
|---|---|---|
| 1,120,002 | Walquist | Dec. 8, 1914 |
| 1,223,586 | Johnson | Apr. 24, 1917 |
| 1,725,679 | Stein | Aug. 20, 1929 |
| 1,753,662 | Merker | Apr. 8, 1930 |
| 2,183,835 | Foulke | Dec. 19, 1939 |
| 2,409,768 | Lavett | Oct. 22, 1946 |
| 2,710,162 | Snoddy | June 7, 1955 |